(12) United States Patent
Pawelec

(10) Patent No.: US 12,164,872 B2
(45) Date of Patent: Dec. 10, 2024

(54) ELECTRONIC APPARATUS FOR RECOMMENDING WORDS CORRESPONDING TO USER INTERACTION AND CONTROLLING METHOD THEREOF

(71) Applicant: SAMSUNG ELECTRONICS CO., LTD., Suwon-si (KR)

(72) Inventor: Krzysztof Pawelec, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 539 days.

(21) Appl. No.: 17/492,151

(22) Filed: Oct. 1, 2021

(65) Prior Publication Data

US 2022/0035999 A1 Feb. 3, 2022

Related U.S. Application Data

(63) Continuation of application No. PCT/KR2021/002439, filed on Feb. 26, 2021.

(30) Foreign Application Priority Data

Jul. 31, 2020 (KR) ........................ 10-2020-0096372

(51) Int. Cl.
*G06F 40/274* (2020.01)
*G06F 3/04883* (2022.01)

(52) U.S. Cl.
CPC ........ *G06F 40/274* (2020.01); *G06F 3/04883* (2013.01)

(58) Field of Classification Search
CPC .. G06F 3/0236; G06F 3/0237; G06F 3/04883; G06F 40/216; G06F 40/253; G06F 40/274
See application file for complete search history.

(56) References Cited

U.S. PATENT DOCUMENTS

| 8,661,340 B2 * | 2/2014 | Goldsmith ............ G06F 3/0486 |
| | | 715/773 |
| 8,782,550 B1 | 7/2014 | Patridge et al. |
| | (Continued) | |

FOREIGN PATENT DOCUMENTS

| JP | 2005032111 A | 2/2005 |
| KR | 1020090028464 A | 3/2009 |
| | (Continued) | |

OTHER PUBLICATIONS

International Search Report (PCT/ISA/210) dated Jun. 11, 2021 issued by the International Searching Authority in International Application No. PCT/KR2021/002439.

(Continued)

*Primary Examiner* — Angela A Armstrong
(74) *Attorney, Agent, or Firm* — Sughrue Mion, PLLC

(57) ABSTRACT

An electronic apparatus and a controlling method thereof are provided. The electronic apparatus includes a memory storing an artificial intelligence model, a display configured to display a keypad screen, and a processor configured to, based on a swipe interaction contacting a first key and connecting a plurality of keys being on the keypad screen, remove from the input window, a first word that is pre-input to the input window, obtain a word candidate list corresponding to the swipe interaction by inputting information regarding a trajectory of the swipe interaction to an artificial intelligence model, and control the display to display, in the input window, a second word having a highest score in the word candidate list.

13 Claims, 10 Drawing Sheets

(56) References Cited

U.S. PATENT DOCUMENTS

| | | | |
|---|---|---|---|
| 9,104,312 B2* | 8/2015 | Kay | G06F 3/04883 |
| 9,285,953 B2 | 3/2016 | Kim et al. | |
| 10,275,152 B2 | 4/2019 | Fallah | |
| 2018/0348891 A1* | 12/2018 | Kim | G06N 3/08 |

FOREIGN PATENT DOCUMENTS

| | | |
|---|---|---|
| KR | 101152293 B1 | 6/2012 |
| KR | 1020140111333 A | 9/2014 |
| KR | 101484582 B1 | 1/2015 |
| KR | 1020180132493 A | 12/2018 |
| KR | 1020190114410 A | 10/2019 |
| WO | 2019189984 A1 | 10/2019 |

OTHER PUBLICATIONS

Written Opinion (PCT/ISA/237) dated Jun. 11, 2021 issued by the International Searching Authority in International Application No. PCT/KR2021/002439.

* cited by examiner

ELECTRONIC APPARATUS FOR RECOMMENDING WORDS CORRESPONDING TO USER INTERACTION AND CONTROLLING METHOD THEREOF

CROSS-REFERENCE TO RELATED APPLICATIONS

This application is a bypass continuation of International Application No. PCT/KR2021/002439, filed on Feb. 26, 2021, which claims priority to Korean Patent Application No. 10-2020-0096372, filed on Jul. 31, 2020 in the Korean Intellectual Property Office, the disclosures of which are incorporated by reference herein by reference in their entireties.

BACKGROUND

1. Field

The disclosure relates to an electronic apparatus and a controlling method thereof, and more particularly, to an electronic apparatus that obtains a word candidate list based on information corresponding to an input user interaction and a controlling method thereof.

2. Description of Related Art

An artificial intelligence system is a computer system that realizes human-level intelligence and unlike an existing rule-based smart system, a machine learns judges and becomes smart by itself. As the artificial intelligence system is being developed, a recognition rate has been improved and users' preference have been more accurately understood and thus, the existing rule-based smart system is gradually being replaced with a deep learning-based artificial intelligence system.

An artificial intelligence technology consists of machine learning (deep-learning) and element technologies utilizing machine learning. The machine learning is an algorithm technology of classifying and learning features of input data by oneself, and the element technology is a technology of using a machine learning algorithm such as deep learning to simulate the functions of a human brain such as cognition, judgement, etc. using a machine learning algorithm, and consists of technical fields such as linguistic understanding, visual understanding, inference/prediction, knowledge representation, a motion control, and the like.

With the development of a network technology, users can conveniently use services anytime and anywhere using various devices and accordingly, the importance of user interfaces provided to the users through various devices has been greatly emphasized.

In particular, various devices provide a virtual a virtual keyboard user interface (UI) based on a touch screen, and users may conveniently input characters by inputting a swipe interaction or a touch interaction on the virtual keyboard.

However, since the trajectory of the swipe interaction input by a user is not consistent, when the user inputs a character through a swipe input, a character that is not intended may be input to a user terminal device.

In addition, in the case of a prior art technology, in order to remove an unintended character, a user has to touch a key for removing the character several times, which causes inconvenience.

SUMMARY

One or more example embodiments provide an electronic apparatus for removing an unintended character and input an intended character efficiently and a controlling method thereof.

According to an aspect of the disclosure, there is provided an electronic apparatus including: a display; a memory storing a first model configured to provide a recommended word corresponding to a user input that is input to the display; and a processor configured to: control the display to display a keypad screen and an input window that displays a word that is input through the keypad screen; obtain a first word candidate list corresponding to a first swipe interaction by inputting, to the first model, first information regarding a first trajectory of the first swipe interaction connecting a plurality of keys on the keypad screen, and control the display to display in the input window, a first word having a highest score in the first word candidate list; based on a second swipe interaction contacting a first key on the keypad screen and connecting the plurality of keys being input while the first word is displayed, remove the first word displayed in the input window and obtain a second word candidate list corresponding to the second swipe interaction by inputting, to the first model, second information regarding a second trajectory of the second swipe interaction; and control the display to display a second word having a highest score in the second word candidate list in the input window.

The processor may be further configured to: identify whether at least one word included in the first word candidate list is included in the second word candidate list; and reduce a score of the at least one word in the second word candidate list based on the at least one word being included in the first word candidate list.

The processor may be further configured to: identify whether the first word is included in the second word candidate list; based on identifying that the first word is included in the second word candidate list, input a sentence including the first word to a second model to obtain suitability of the first word in the sentence; and adjust a score of the first word based on the suitability of the first word.

The processor may be further configured to: based on a third swipe interaction contacting a second key on the keypad screen and connecting the plurality of keys being input while the second word is displayed, remove a third word displayed in the input window before the first word is input, and obtain a third word candidate list corresponding to the third swipe interaction by inputting a third trajectory of the third swipe interaction to the first model; and control the display to display a fourth word having a highest score in the third word candidate list in an area where the third word is located in the input window.

The processor may be further configured to: based on a fourth swipe interaction contacting a third key on the keypad screen and connecting the plurality of keys being input, obtain a fourth word candidate list corresponding to the fourth swipe interaction by inputting, to the first model, fourth information regarding a fourth trajectory of the fourth swipe interaction; and control the display to change a fifth word having a highest score in the fourth word candidate list to uppercase letters and display the changed fifth word in the input window.

The processor may be further configured to: based on a fifth swipe interaction contacting a fourth key on the keypad screen and connecting the plurality of keys being input, obtain a fifth word candidate list corresponding to the fifth swipe interaction by inputting, to the first model, fifth information regarding a fifth trajectory of the fifth swipe interaction; and control the display to display a website address corresponding to a sixth word having a highest score in the fifth word candidate list on the input window.

The processor may be further configured to: based on a sixth swipe interaction contacting a fifth key on the keypad screen and connecting the plurality of keys being input, obtain a sixth word candidate list corresponding to the sixth swipe interaction by inputting to the first model, sixth information regarding a sixth trajectory of the sixth swipe interaction; and identify a seventh word having a highest score in the sixth word candidate list, and control the display to display a list user interface (UI) including at least one word in which a suffix is added to the seventh word.

The processor may be further configured to: based on a user interaction for removing the second word within a threshold time after the second word in the second word candidate list is displayed on the input window not being input, train the first model based on the second word and the second information.

The processor may be further configured to control the display to display a list UI in which words included in the second word candidate list are aligned according to a score of each of the words included in the second word candidate list.

According to another aspect of the disclosure, there is provided a controlling method of an electronic apparatus that stores a first model configured to provide a recommend word corresponding to a user input that is input to a display. The controlling method may include: displaying a keypad screen and an input window that displays a word that is input through the keypad screen; obtaining a first word candidate list corresponding to a first swipe interaction by inputting, to the first model, first information regarding a first trajectory of the first swipe interaction connecting a plurality of keys on the keypad screen, and displaying in the input window, a first word having a highest score in the first word candidate list; based on a second swipe interaction contacting a first key on the keypad screen and connecting the plurality of keys being input while the first word is displayed, removing the first word displayed on the input window and obtaining a second word candidate list corresponding to the second swipe interaction by inputting, to the first model, second information regarding a second trajectory of the second swipe interaction; and displaying, in the input window, a second word having a highest score in the second word candidate list.

The displaying may include: identifying whether at least one word included in the first word candidate list is included in the second word candidate list; and reducing a score of the at least one word included in the second word candidate list based on the at least one word being included in the first word candidate list.

The displaying may include: identifying whether the first word is included in the second word candidate list; based on identifying that the first word is included in the second word candidate list, inputting a sentence including the first word to a second model to obtain suitability of the first word in the sentence; and adjusting a score of the first word based on the suitability of the first word.

The controlling method may further include: based on a third swipe interaction contacting a second key on the keypad screen and connecting the plurality of keys being input while the second word is displayed, removing a third word displayed in the input window before the first word is input, and obtaining a third word candidate list corresponding to the third swipe interaction by inputting a third trajectory of the third swipe interaction to the first model; and displaying a fourth word having a highest score in the third word candidate list in an area where the third word is located in the input window.

The controlling method may further include: based on a fourth swipe interaction contacting a third key on the keypad screen and connecting the plurality of keys being input, obtaining a fourth word candidate list corresponding to the fourth swipe interaction by inputting, to the first model, fourth information regarding a fourth trajectory of the fourth swipe interaction; and changing a fifth word having a highest score in the fourth word candidate list to uppercase letters and displaying the changed fifth word in the input window.

The controlling method may further include: based on a fifth swipe interaction contacting a fourth key on the keypad screen and connecting the plurality of keys being input, obtaining a fifth word candidate list corresponding to the fifth swipe interaction by inputting, to the first model, fifth information regarding a fifth trajectory of the fifth swipe interaction; and displaying, in the input window, a website address corresponding to a sixth word having a highest score in the fifth word candidate list.

According to another aspect of the disclosure, a non-transitory computer-readable storage medium storing a program that is executable by at least one processor to perform a method of controlling an electronic device, the method including: identifying a first trajectory of a first touch that is input to a keypad screen to connect a plurality of keys on the keypad screen; obtaining a first word candidate list corresponding to the first touch by inputting, to an artificial intelligence model, information of the first trajectory; displaying, in a text input field, a first word that has a highest score among a plurality of first words included in the first word candidate list; based on a second touch being input to touch a first key and connect the plurality of keys while the first word is displayed in the text input field, removing the first word from the text input field, and obtaining a second word candidate list corresponding to the second touch by inputting, to the first model, second information regarding a second trajectory of the second touch; and displaying, in the text input field, a second word that has a highest score among a plurality of second words included in the second word candidate list.

The method may further include updating the first model by reducing a probability score of the first word that has been removed from the text input field, and the obtaining the second word candidate list may include obtaining the second word candidate list using the updated first model.

The method may further include: based on identifying that the first word is included in the second word candidate list, inputting a sentence including the first word to a second model to determine whether a usage of the first word in the sentence is correct; and adjusting a score of the first word based on a determination of whether the usage of the first word in the sentence is correct.

The first touch may be a first swipe interaction of drawing a first continuous line that connects the plurality of keys on the keypad screen, and the second touch may be a second swipe interaction of drawing a second continuous line that connects the first key and the plurality of keys on the keypad screen.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure will be described in detail with reference to accompanying drawings.

Figure 1A:
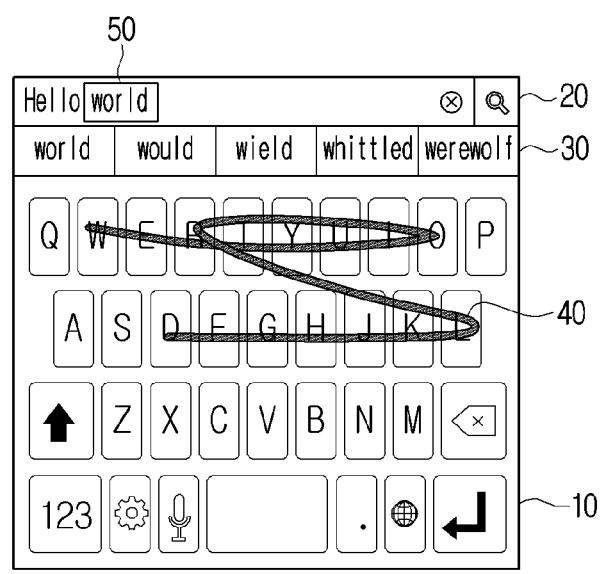
FIGS. 1A and 1B illustrate a process in which an electronic apparatus performs an operation corresponding to an input user interaction according to an embodiment.
Figure 1B:
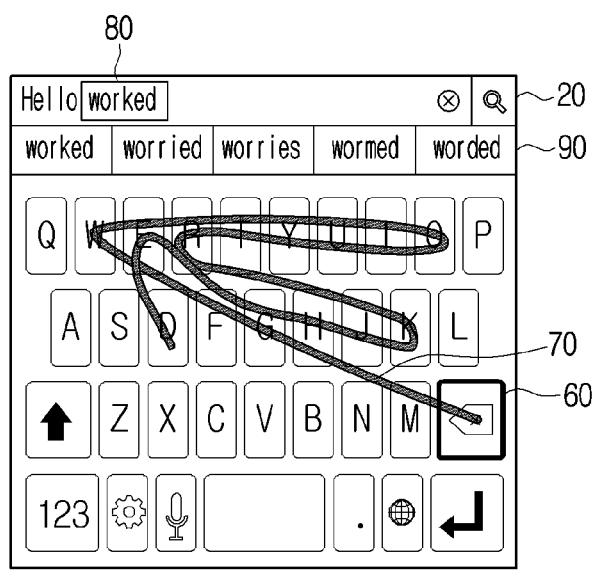

FIGS. 1A and 1B illustrate a process in which an electronic apparatus 100 performs an operation corresponding to an input user interaction according to an embodiment.

The electronic apparatus 100 may display a keypad screen 10 and an input window (e.g., an input field or a text input field) 20 that displays a character, a number, etc. input through the keypad screen 10. The keypad screen 10 may correspond to a virtual keyboard (or an on-screen keyboard) screen implemented to display and receive various characters via a touch screen, a mouse, a finger movement, etc.

The keypad screen 10 may include a plurality of keys for inputting characters, numbers, etc. The keys refer to a keyboard screen arranged to input characters, numbers, etc. on the input window 20.

The keypad screen 10 may be configured with a keyboard layout of various languages such as a Korean keyboard, an English keyboard, a Chinese keyboard, a Japanese keyboard, etc. In addition, the keypad screen 10 may be implemented in the layout of, for example, a QWERTY keyboard, a QWERTZ keyboard, an AZERTY keyboard, a QZERTY keyboard, a DVORAK keyboard, a COLEMAK keyboard, etc. In addition, the shape, size, spacing, arrangement, etc. of the keys included in the keypad screen 10 may be set in various ways.

The input window 20 refers to an area in which various characters or numbers input through the keypad screen 10 are displayed. According to FIGS. 1A and 1B, the input window 20 is implemented as a search window in which a word input through the keypad screen 10 is displayed, but this is only an example. The input window 20 may be implemented as various interface screens such as an application screen, etc. in which an input word is displayed.

When a user interaction (e.g., a touch interaction, a swipe interaction, etc.) is input on the keypad screen 10, the electronic apparatus 100 may display a word corresponding to the input user interaction on the input window 20. The touch interaction refers to an interaction in which a finger or a pointing device touches a specific area on the screen. The swipe interaction refers to an interaction in which a finger or a pointing device drags in a horizontal, vertical or curved trajectory while a first area on the keypad screen 10 is touched, and drops in the second area.

The electronic apparatus 100 may receive a first swipe interaction connecting a plurality of keys on the keypad screen 10 from a user. In other words, in order to display words corresponding to a plurality of keys on the input window 20, the electronic apparatus 100 may receive the first swipe interaction for swiping to connect a plurality of keys from the user. The electronic apparatus 100 may detect a trajectory 40 of a finger or a pointing device that touches or drags the plurality of keys on the keypad screen 10 based on the received first swipe interaction.

For example, as illustrated in FIG. 1A, the electronic apparatus 100 may receive the first swipe interaction that connects keys representing five characters from a user so that a word (e.g., the word "world") consisting of the five characters (e.g., the letters, "w," "o," "r," "l" and "d") is displayed on the input window 20. In addition, the electronic apparatus 100 may detect the trajectory 40 of the received first swipe interaction.

The first swipe interaction illustrated in FIG. 1A may be an interaction in which the first key (e.g., the letter "w") on the keypad screen 10 is dragged to the fifth key (e.g., the letter "d") via the second key (e.g., the letter "o"), the third key (e.g., the letter "r"), and the fourth key (e.g., the letter "l"), while being touched by a finger or a pointing device, and by a finger or a pointing device and dragged via the second key to the fifth key, and the finger or the pointing device is released from the fifth key on the keypad screen 10.

The electronic apparatus 100 may generate first information related to the detected trajectory 40. For example, the first information may include a coordinate value of points forming the trajectory 40 corresponding to the first swipe interaction among coordinates representing the keypad screen 10.

The coordinate values of the points forming the trajectory 40 may be values determined based on the coordinates representing the keypad screen 10. The coordinates representing the keypad screen 10 may be set based on the edge of the keypad screen 10, and relative coordinate values of the points forming the trajectory 40 may be determined with reference to the coordinates representing the set keypad screen 10.

In another example, the first information may include information regarding a shape, a direction and a size of the trajectory 40 formed on the keypad screen 10.

For example, referring to FIG. 1A, when the first swipe interaction that touches the key representing the letter "w" and drags the key in various directions until releasing it from the key representing the letter "d" is input, the electronic apparatus 100 may detect the trajectory 40 corresponding to the input first swipe interaction and generate first information regarding the detected trajectory 40. In this case, the first information may include information that the trajectory 40 starts from the key representing the letter "w," passes through the key representing the letter "o" and then moves in the direction toward the key representing the letter "r."

In another example, the first information may include information regarding the keypad screen 10 and an image capturing the trajectory 40 formed by the first swipe interaction on the keypad screen 10. The information regarding the image may include the shape and size of the keypad screen 10 and the relative shape, size and direction of the trajectory 40 with reference to the shape and size of the keypad screen 10.

In another example, the first information may include a key matching table indicating matching of the keys to a trajectory 25 formed by the first swipe interaction, which will be described in detail with reference to FIG. 2.

The electronic apparatus 100 may obtain a first word candidate list corresponding to the first swipe interaction by inputting the generated first information to a first model. The first model is an artificial intelligence model trained to output a word candidate list corresponding to information regarding a trajectory corresponding to an input swipe interaction.

The first model may be trained using a trajectory formed by a swipe interaction input on the keypad screen 10 and character information corresponding to the trajectory as training data. For example, the training data may include a trajectory formed by a swipe interaction and a word corresponding to the formed trajectory from among a plurality of words included in database (or a dictionary).

In addition, the training data for training the first model may include information regarding various trajectories (e.g., the size, direction, shape, etc. of trajectories) corresponding to a specific word in word database. The various trajectories may be generated through various algorithms and may include, for example, straight edges, curved edges, Ferguson curves, Bezier curve, B-spline curve, etc.

The first model may be provided in the electronic apparatus 100, but this is only an example. The first model may be stored and managed in an external server. When the first model is stored in an external server, the electronic apparatus 100 may transmit the first information to the external server. Also, the electronic apparatus 100 may receive a result output by the first model by processing the first information. In another example, the electronic apparatus 100 may receive a pre-trained first model from an external server.

The first model may include various modules and word database, and include various types of artificial intelligence neural networks. The configuration of the first model will be described in detail with reference to FIG. 8.

The first model may output a word that is estimated to correspond to the trajectory 40 formed by the first swipe interaction and may output a score of the estimated word based on the input first information. The score means a probability that a specific word is a word corresponding to the trajectory 40. In other words, the high score of the specific word means that the trajectory formed by the swipe interaction input by a user has a high probability of corresponding to the specific word.

The electronic apparatus 100 may obtain the first word candidate list corresponding to the first swipe interface 40 by inputting the generated first information to the first model. The first word candidate list is a list consisting of a plurality of words whose score is equal to or greater than a predetermined value. In other words, the word candidate list means a group of words estimated to correspond to the trajectory 40.

The electronic apparatus 100 may display a list user interface (UI) 20 in which words included in the first word candidate list are aligned according to a size of a score. In the list, words having a higher score may be arranged further forward. For example, as illustrated in FIG. 1A, if the score of 'world' is the highest in the first word candidate list, the electronic apparatus 100 may display the list UI 30 in which 'world' is arranged first.

Meanwhile, referring to FIG. 1A, the list UI 30 illustrates that five words having a high score among words included in the first word candidate list are arranged in order of score, but this is only an example. The arrangement of the list UI 30, the number of words included, etc. can be set in various ways according to a user setting.

The electronic apparatus 100 may display a first word 50 having the highest score among words included in the first word candidate list on the input window 20. If a word other than the first word 50 in the first word candidate list 30 is selected by a user, the electronic apparatus 100 may remove the first word 50 from the input window 20 and display the selected word in the input window 20.

Referring to FIG. 1B, when a second swipe interaction contacting a first key (e.g., an enter key) 60 on the keypad 10 and connecting a plurality of keys is input while the first word 50 is displayed, the electronic apparatus 100 may remove the first word 50 displayed on the input window 20 and obtain the second word candidate list corresponding to the second swipe interaction by inputting the second information regarding a trajectory 70 corresponding to the second swipe interaction to the first model. Here, the first key 60 may be set as a key for removing a specific word on the keypad screen 10, but this is only an example. The first key 60 may be set as various keys by a user.

Based on the second swipe interaction contacting the first key 60 and connecting a plurality of keys being input, the electronic apparatus 100 may detect the trajectory 70 corresponding to the second swipe interaction starting from the first key 60. If it is detected that the trajectory 70 is started from the first key 60 and proceeds in a direction connecting other keys, the electronic apparatus 100 may remove the first word 50 displayed in the input window 20 and generate the second information regarding the trajectory 70.

The second information may include information regarding the direction, size, etc. of the trajectory 70 formed by the second swipe interaction which starts from the first key 60. In another example, the second information may include the coordinate values of points forming the trajectory 70 starting from the first key 60.

In another example, the second information may include information regarding the keypad screen 10 and an image capturing the trajectory 70 starting from the first key 60. The information related to the image may indicate the shape and size of the keypad screen 10, the shape, size and direction of the trajectory 70.

In another example, the second information may include a key matching table indicating matching of the keys to a trajectory 25 formed by the second swipe interaction, which will be described in detail with reference to FIG. 2.

The electronic apparatus 100 may obtain the second word candidate list corresponding to the second swipe interaction by inputting the second information to the first model. The first model may output the second word candidate list including a plurality of words that could be estimated to correspond to the trajectory 70 formed by the second swipe interaction. In addition, the first model may output a score of each word included in the second word candidate list.

The electronic apparatus 100 may display a list UI 90 in which words included in the second word candidate list are aligned according to the score of each word included in the second word candidate list. In addition, the electronic apparatus 100 may display a second word 80 having the highest score in the second word candidate list on the input window 20.

If the pre-input first word 50 is not a word intended by a user, the electronic apparatus 100, in order to remove the unintended first word 50, may receive a user interaction for touching a key for removing the specific word and maintaining the touch for a predetermined time or a user interaction for touching a key for removing the specific word several times, from the user.

In the above embodiment, in order to display a word intended by the user on the input window 20, the electronic apparatus 100 may receive a user interaction corresponding to the intended word on the keypad screen 10 after the first word displayed on the input window is removed, from the user.

However, if the second swipe interaction 70 for contacting the first key 60 and connecting a plurality of keys is input, the electronic apparatus 100 may obtain the second word candidate list corresponding to the second swipe interaction by removing the pre-input first word 50 immediately and inputting the second information to the first model.

Subsequently, the electronic apparatus 100 may display the second word having the highest score in the second word candidate list on the input window 20. Accordingly, a user may remove an unintended word in a more efficient method and input an intended word on the input window 20.

Figure 2:
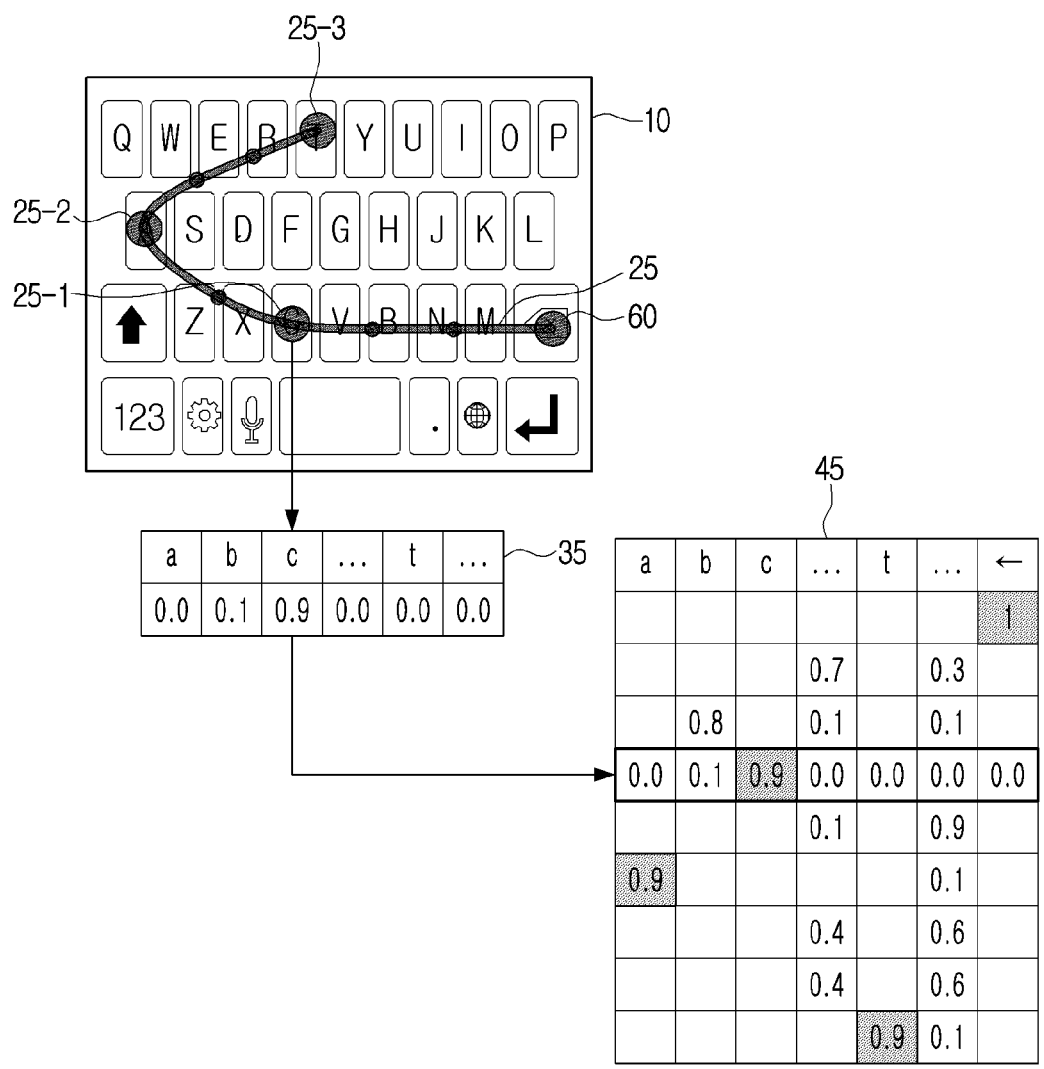
FIG. 2 is a view provided to explain a process in which an electronic apparatus performs an operation corresponding to an input user interaction according to an embodiment.

FIG. 2 illustrates a process in which the electronic apparatus 100 performs an operation corresponding to an input user interaction according to an embodiment. FIG. 2 is a view provided to explain an operation corresponding to the second user interaction for removing an unintended word and inputting a new word by a user.

Based on the second swipe interaction contacting the first key 60 on the keypad screen 10 and connecting a plurality of keys being input, the electronic apparatus 100 may remove the first word that is pre-input on the input window 20 and generate the second information regarding the trajectory 25 by detecting the trajectory 25 corresponding to the second swipe interaction.

For example, the second information may include information regarding the shape and direction of the trajectory 25 starting from the first key 60 on the keypad screen 10. In another example, the second information may include coordinate values of points forming the trajectory 25 starting from the first key 60.

In another example, the second information may include a key matching table indicating matching of the keys to the trajectory 25. The key matching table means a table indicating a probability that a specific key among a plurality of keys included in the keypad screen 10 is a key matching the trajectory 25.

For example, as illustrated in FIG. 2, based on the second swipe interaction being input, the electronic apparatus 100 may detect that the trajectory 25 formed by the input second swipe interaction starts from the first key 60 and passes through a key 25-1 indicating the letter "c." The electronic apparatus 100 may identify that a probability that the key corresponding to the trajectory 25 is a key indicating the letter "c" among keys included in the entire keypad screen 10 is 90% based on a result of the detection. The electronic apparatus 100 may generate a key matching table 35 indicating that a probability of the key that the trajectory 25 has passed through among the keys included in the entire keypad screen 10 being c is 90%.

The electronic apparatus 100 may detect a trajectory that passes through a key 25-2 indicating the letter "a" and ends at a key 25-3 indicating the letter "t," and generate a key matching table 45 based on a result of the detection.

The electronic apparatus 100 may obtain the second word candidate list corresponding to the second swipe interaction by inputting the generated key matching table 45 to the first model. For example, the electronic apparatus 100 may obtain the second word candidate list including 'cat', 'bcat', etc. using the key matching table 45 through the first model. If the score of the 'cat' in the second word candidate list is the highest, the electronic apparatus 100 may display 'cat' on the input window.

Figure 3:
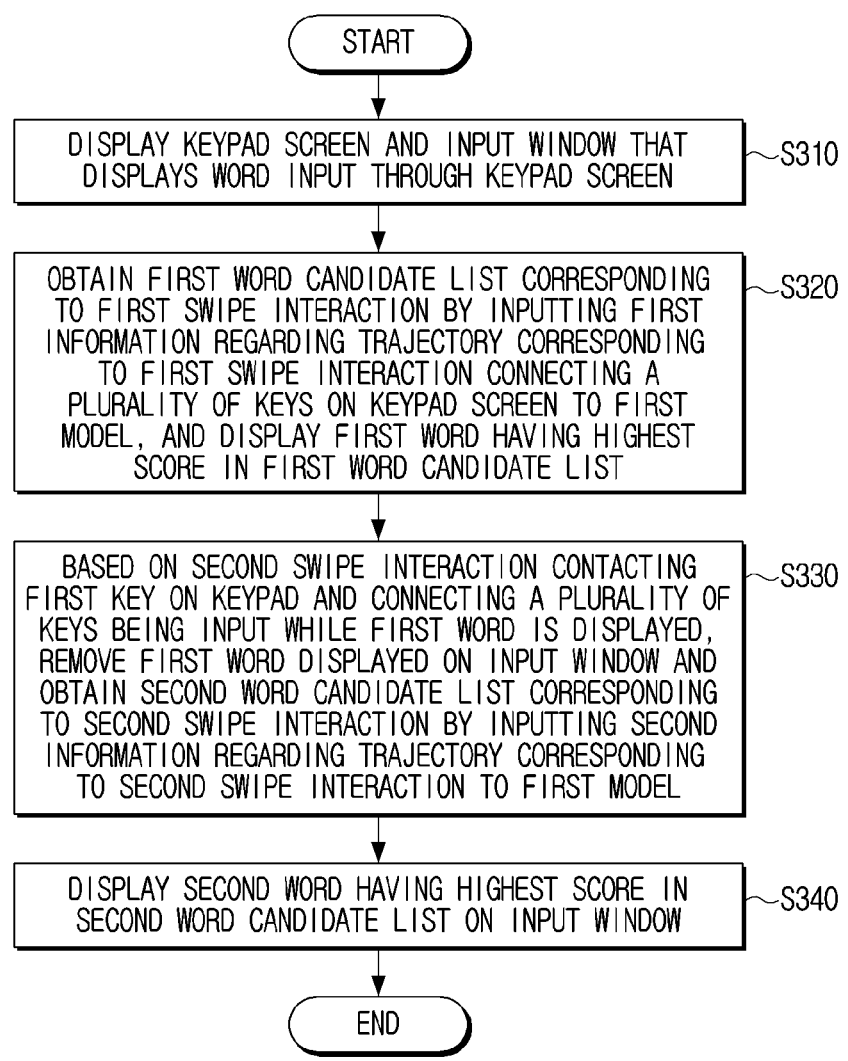
FIG. 3 is a flowchart provided to explain a controlling method of an electronic apparatus according to an embodiment.

FIG. 3 is a flowchart provided to explain a controlling method of the electronic apparatus 100 according to an embodiment.

The electronic apparatus 100 may display an input window displaying a keypad screen and a word input through the keypad screen (operation S310). The input window may be implemented as an application screen or a search window for inputting a character or a number. When a user command to input a specific character or number on the input window is received, the electronic apparatus 100 may display a keypad screen on the input window or in another area.

The electronic apparatus 100 may obtain the first word candidate list corresponding to the first swipe interaction by inputting the first information regarding a trajectory corresponding to the first swipe interaction connecting a plurality of keys on the keypad screen to the first model, and display the first word having the highest score in the first word candidate list on the input window (operation S320). Since the process in which the electronic apparatus 100 obtains the first word candidate list and displays the first word on the input window has been described above, an overlapping description will be omitted.

Based on the second swipe interaction contacting the first key in the keypad and connecting a plurality of keys being input while the first word is displayed within a threshold time, the electronic apparatus 100 may remove the first word displayed on the input window and obtain the second word candidate list corresponding to the second swipe interaction by inputting the second information regarding a trajectory corresponding to the second swipe interaction to the first model (operation S330).

Based on the second swipe interaction contacting the first key and connecting a plurality of keys being input, the electronic apparatus 100 may detect a trajectory corresponding to the second swipe interaction. If it is detected that a trajectory corresponding to the second swipe interaction starts from the first key and proceeds in a direction in which other keys are connected, the electronic apparatus 100 may remove the first word pre-input on the input window. Subsequently, the electronic apparatus 100 may generate the second information regarding the detected trajectory, and obtain the second word candidate list by inputting the generated second information to the first model.

The electronic apparatus 100 may display the second word having the highest score in the second word candidate list on the input window (operation S340). In other words, the electronic apparatus 100 may display the newly input second word in an area where the first word is displayed on the input window.

Based on the second word candidate list being obtained, the electronic apparatus 100 may adjust the score of a word included in the second word candidate list. For example, the electronic apparatus 100 may adjust the score based on whether the second word candidate list includes a word included in the first word candidate list, which will be described in detail with reference to FIG. 4.

In another example, the electronic apparatus 100 may adjust a score based on a probability that a word included in the second word candidate list becomes the first word or the last word, which will be described in detail with reference to FIG. 5.

If a user interaction for removing the second word is not input within a threshold time after the second word having the highest score in the second word candidate list is displayed on the input window, the electronic apparatus 100 may train the first model based on the second word and the second information, which will be described in detail with reference to FIG. 6.

If the second word is displayed on the input window and a third swipe interaction contacting the second key and connecting a plurality of keys is input, the electronic apparatus 100 may remove the third word displayed on the input window before the first word is input, which will be described in detail with reference to FIG. 7.

Figure 4:
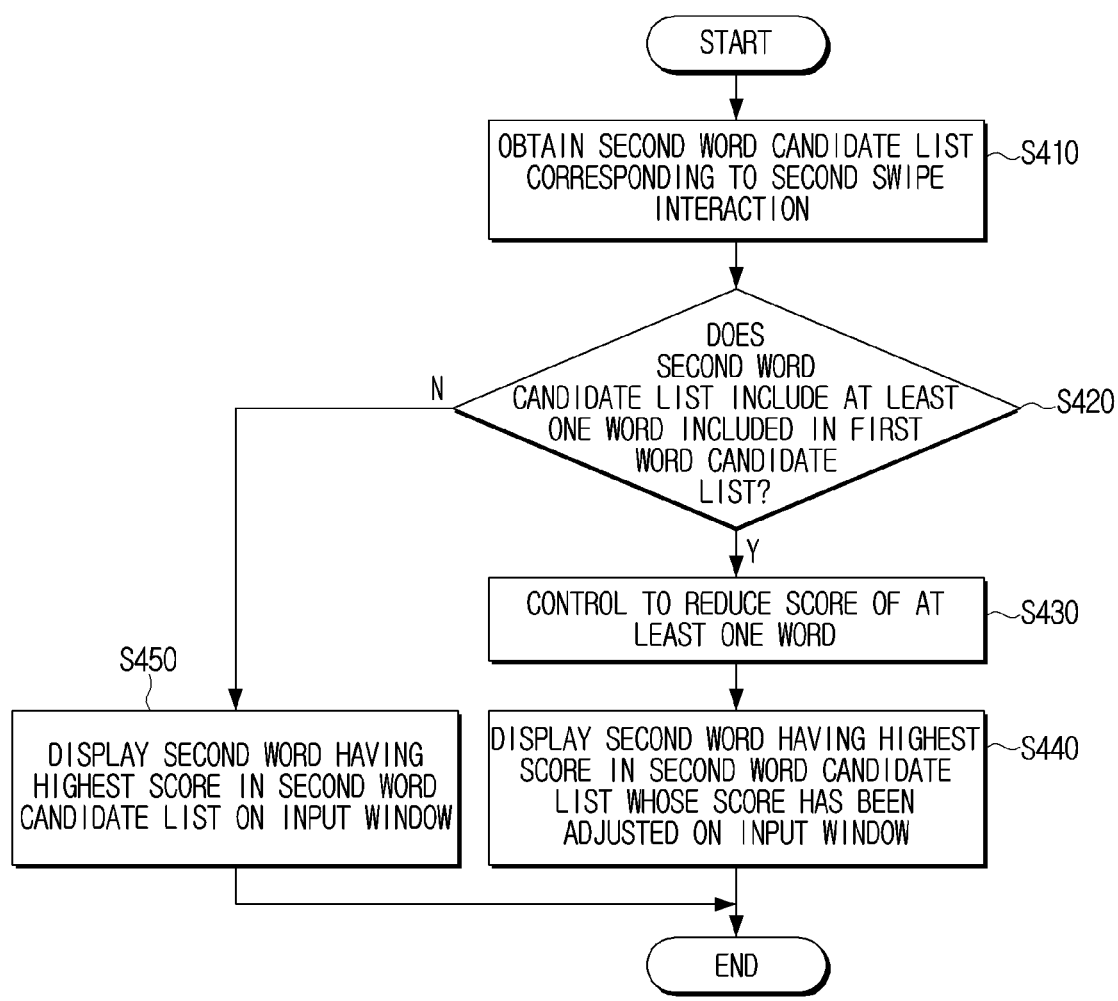
FIG. 4 is a flowchart provided to explain a process in which an electronic apparatus adjusts a score of a word included in a word candidate list according to an embodiment.

FIG. 4 is a flowchart provided to explain a process in which the electronic apparatus 100 adjusts a score of a word included in a word candidate list according to an embodiment. As described above with respect to operation S330 of FIG. 3, FIG. 4 is a flowchart provided to explain an embodiment in which the electronic apparatus 100 adjusts a score of a word included in the second word candidate list after obtaining the second word candidate list.

The electronic apparatus 100 may obtain the second word candidate list corresponding to the second swipe interaction (operation S410). The process of obtaining the second word candidate list has been described above and thus, an overlapping description will be omitted.

The electronic apparatus 100 may identify whether the second candidate list includes at least one word included in the first word candidate list (operation S420). For example, at least one word included in the first word candidate list (e.g., the first word having the highest score, etc.) may be included in the second word candidate list. In this case, the electronic apparatus 100 may identify at least one word included in the second word candidate list.

If it is identified that the second word candidate list includes at least one word included in the first word candidate list, the electronic apparatus 100 may control to reduce the score of the identified at least one word (operation S430).

The fact that the second swipe interaction contacting the first key and connecting a plurality of keys is input while the first word is displayed may mean that the word included in the first word candidate list is highly likely to be a word that is not intended by a user. The electronic apparatus 100 may reduce the score of the at least one word identified in the second word candidate list to reduce a probability that an unintended word is displayed on the input window. For example, the electronic apparatus 100 may reduce the score of the at least one word to a predetermined number or a zero (0) value.

The electronic apparatus 100 may display the second word having the highest score in the second word candidate list whose score has been adjusted on the input window (operation S440). Subsequently, the electronic apparatus 100 may display a list UI in which words included in the second word candidate list whose score has been adjusted are aligned according to a score.

If it is identified that the second word candidate list does not include at least one word included in the first word candidate list, the electronic apparatus 100 may display the second word having the highest score in the second word candidate list on the input window (operation S450).

Figure 5:
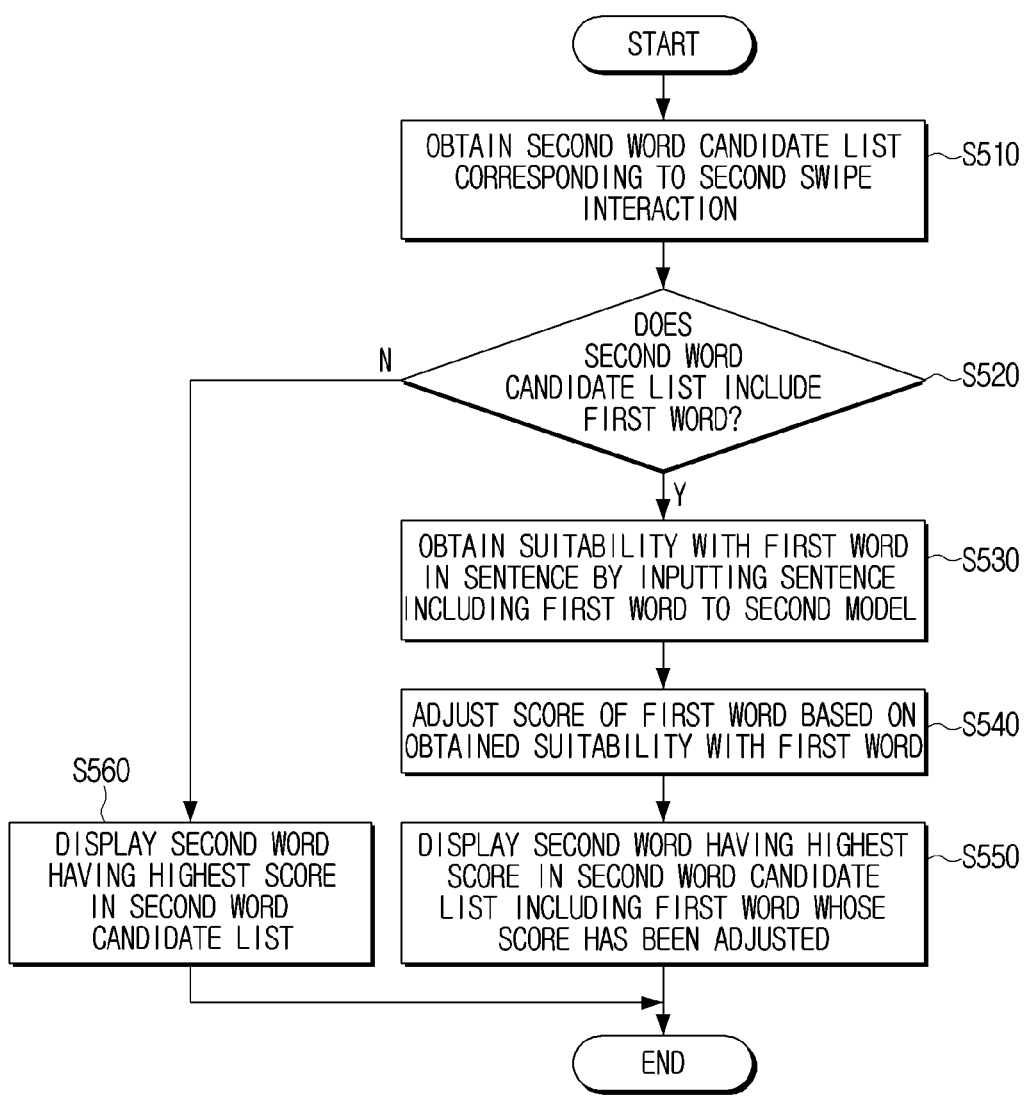
FIG. 5 is a flowchart provided to explain a process in which an electronic apparatus adjusts a score of a word included in a word candidate list according to an embodiment.

FIG. 5 is a flowchart provided to explain a process in which the electronic apparatus 100 adjusts a score of a word included in a word candidate list according to an embodiment. As described above with respect to operation S330 of FIG. 3, FIG. 5 is a flowchart provided to explain an embodiment in which the electronic apparatus 100 adjusts a score of a word included in the second word candidate list after obtaining the second word candidate list.

The electronic apparatus 100 may obtain the second word candidate list corresponding to the second swipe interaction (operation S510). The process of obtaining the second word candidate list has been described above and thus, an overlapping description will be omitted.

The electronic apparatus 100 may identify whether the first word is included in the second word candidate list (operation S520). For example, the first word may be a word that has the highest score in the first word candidate list corresponding to the first swipe interaction, but has been removed from the input window (see operation S330).

If it is identified that the first word is included in the second word candidate list, the electronic apparatus 100 may obtain a suitability of the first word in a sentence by inputting the sentence including the first word to the second model (operation S530).

The suitability of the first word in the sentence may mean a probability that a grammatical error does not occur in the sentence including the first word. In another example, the suitability of the first word in the sentence may mean a probability related to whether including the first word in the sentence is contextually appropriate.

The second model is an artificial intelligence model that is trained to figure out the meaning of an input sentence and identify whether the sentence is grammatically correct, and may include a Natural Language Understanding (NLU) module.

In addition, the second model may be trained to output a probability that adding a specific word to a specific location of a sentence is grammatically appropriate or a probability that a grammatical error does not occur. The second model may be trained to output a probability related to whether adding a specific word to a sentence is grammatically appropriate through learning data including corpus or various text data.

The electronic apparatus 100 may adjust the score of the first word based on the obtained suitability of the first word (operation S540).

For example, a high suitability of the first word may mean that there is a high probability that adding the first word to a sentence is contextually appropriate or a grammatical error does not occur. Alternatively, a low suitability of the first word may mean that there is a high probability that adding the first word is grammatically inappropriate or an error occurs.

Accordingly, if the suitability of the first word exceeds a first threshold value, the electronic apparatus 100 may increase the score of the first word by a predetermined value. If the suitability of the first word exceeds a second threshold value and is less than the first threshold value, the electronic apparatus 100 may maintain the score of the first word. If the suitability of the first word is less than the second threshold value, the electronic apparatus 100 may reduce the score of the first word. Here, the first threshold value may be a value greater than the second threshold value.

The electronic apparatus 100 may display the second word having the highest score in the second word candidate list including the first word whose score has been adjusted on the input window (operation S550). The electronic apparatus 100 may display a list UI in which words included in the second word candidate list whose score has been adjusted are aligned according to a size of a score.

If it is identified that the first word is not included in the second word candidate list, the electronic apparatus 100 may display the second word having the highest score in the second word candidate list on the input window (operation S560).

Figure 6:
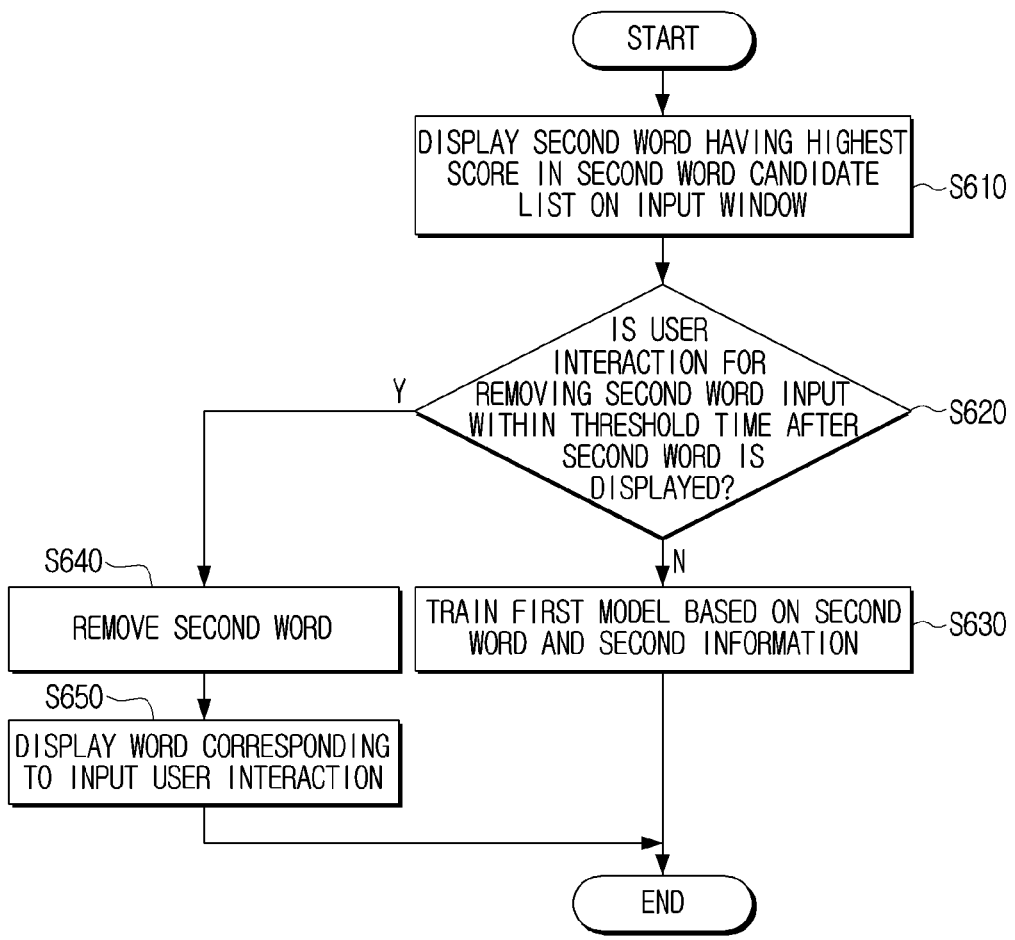
FIG. 6 is a view provided to explain a process in which an electronic apparatus trains a model according to an embodiment.

FIG. 6 is a view provided to explain a process in which the electronic apparatus 100 trains the first model according to an embodiment. As described above with respect to S340 of FIG. 3, FIG. 6 is a flowchart provided to explain an embodiment in which the electronic apparatus 100 trains the first model after displaying the second word having the highest score in the second word candidate list on the input window.

The electronic apparatus 100 may display the second word having the highest score in the second word candidate list on the input window (operation S610). After displaying the second word, the electronic apparatus 100 may identify whether a user interaction for removing the second word is input within a threshold time (operation S620).

For example, the electronic apparatus 100 may identify whether a user interaction of touching a key for removing the second word is input within a threshold time after the second word is displayed. In another example, the electronic apparatus 100 may identify whether a swipe interaction contacting the first key and connecting a plurality of keys is input within a threshold time after the second word is displayed.

The fact that a user interaction for removing the second word is not input on the input window within a threshold time after the second word is displayed may mean that the second word is a word intended by a user. In other words, it may mean that the trajectory formed by the second swipe interaction corresponds to the second word.

If a user interaction for removing the second word is not input within a threshold time after the second word is displayed, the electronic apparatus 100 may train the first model based on the second word and the second information (operation S630). Accordingly, the electronic apparatus 100 may increase a probability that a word intended by the user is displayed on the input window through the pre-trained first model.

For example, the first model may be trained to output the second word from word database when information regarding a trajectory formed by the second swipe interaction (e.g., the direction, shape, size, etc. of the trajectory) is input under the control of the electronic apparatus 100.

In another example, the electronic apparatus 100 may train the first model based on a trajectory formed by the second swipe interaction excluding a path between the first key and a key indicating the first letter of the second word.

In other words, the first model may be trained to output the second word from word database when information regarding a trajectory formed by the second swipe interaction excluding a path between the first key and a key indicating the first letter of the second word is input under the control of the electronic apparatus 100.

If a user interaction for removing the second word is input within a threshold time after the second word is displayed, the electronic apparatus 100 may remove the second word (operation S640). Subsequently, the electronic apparatus 100 may display a word corresponding to the input user interaction on the input window (operation S650).

For example, if a swipe interaction contacting the first key and connecting a plurality of keys is input within a threshold time after the second word is displayed, the electronic apparatus 100 may remove the second word and obtain a word candidate list corresponding to the swipe interaction by inputting information regarding a trajectory corresponding to the input swipe interaction to the first model. Subsequently, the electronic apparatus 100 may display a word having the highest score in the word candidate list on the input window.

Figure 7:
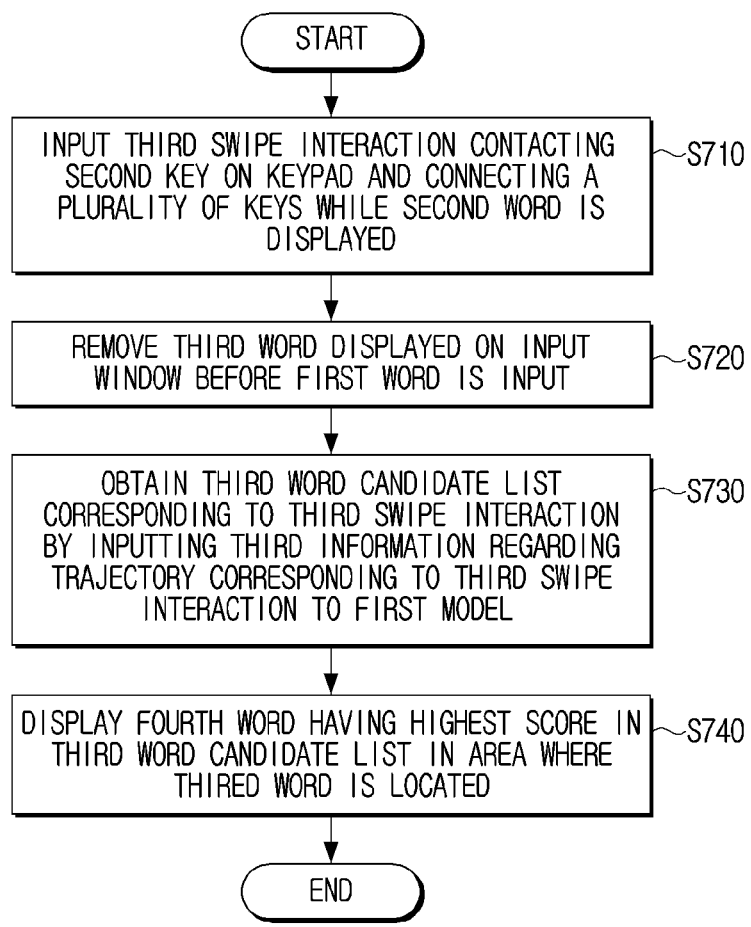
FIG. 7 is a view provided to explain an operation of an electronic apparatus according to an embodiment.

FIG. 7 is a view provided to explain an operation of the electronic apparatus 100 according to an embodiment.

The electronic apparatus 100 may receive the third swipe interaction contacting the second key in the keypad and connecting a plurality of keys while the second word is displayed on the input window (operation S710). For example, the second key may be a key indicating a space bar on the keypad screen 10, but the embodiment is not limited thereto and the second key may be set as various keys.

The electronic key 100 may detect a trajectory corresponding to the third swipe interaction contacting the second key and connecting a plurality of keys. When the trajectory is detected, the electronic apparatus 100 may remove the third word displayed on the input window before the first word is input (operation S720). The third word means a word before the first word is input. For example, referring to FIG. 1A, the third word may be the word 'Hello' which is displayed before the first word 50 in the input window 20.

The electronic apparatus 100 may obtain the third word candidate list corresponding to the third swipe interaction by inputting the third information regarding a trajectory corresponding to the third swipe interaction to the first model (operation S730). In this case, the third information is information regarding a trajectory formed by the third swipe interaction, and the type of the third information is the same as that of the first information and the second information.

In addition, the electronic apparatus 100 may display a fourth word having the highest score in the third word candidate list in an area where the third word is located on the input window (operation S740).

The electronic apparatus 100 may receive a user interaction for locating a character cursor at the right of the last character of the third word, and remove the third word which is input before the first word by receiving a user interaction for touching a key for removing the character several times.

However, when the third swipe interaction is input, the electronic apparatus 100 may remove the third word and display the fourth word at the location of the third word. In other words, a user may display the fourth word at the location of the third word efficiently using the third swipe interaction without performing any additional operation of locating the character cursor at the right of the last character of the third word, etc.

Figure 8:
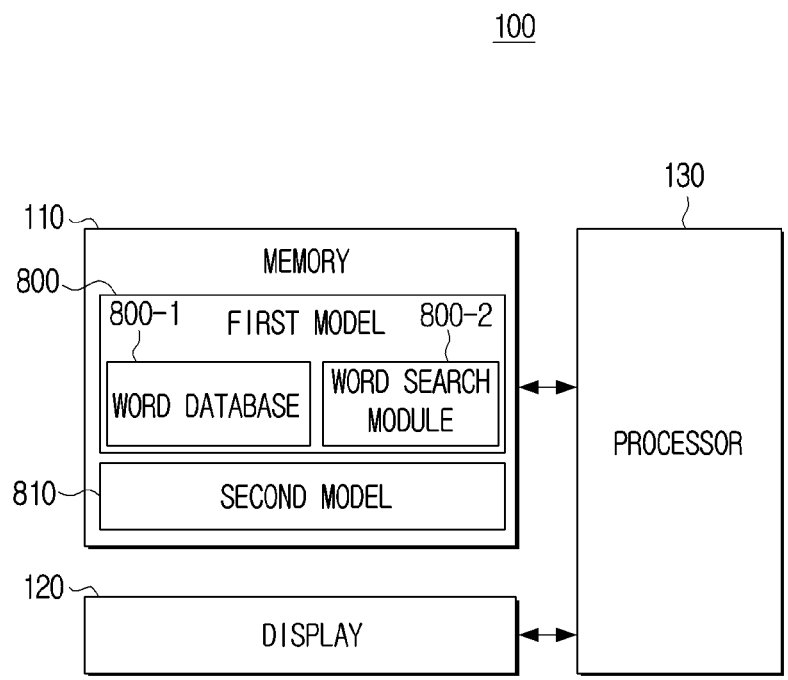
FIG. 8 is a block diagram illustrating configuration of an electronic apparatus briefly according to an embodiment.

FIG. 8 is a block diagram illustrating configuration of the electronic apparatus 100 according to an embodiment. As illustrated in FIG. 8, the electronic apparatus 100 may include a memory 110, a display 120 and a processor 130.

However, the configuration illustrated in FIG. 8 is an exemplary view for implementing embodiments of the present disclosure, and appropriate hardware and software components at a level obvious to those skilled in the art may be further included.

The memory 110 may store commands or data related to at least one other component of the electronic apparatus 100. In addition, the memory 110 may be accessed by the processor 130, and reading, writing, modifying, deleting, and/or updating of data may be performed by the processor 130.

In the present disclosure, the element "memory" may include the memory 110, a read-only memory (ROM) in the processor 130, a random-access memory (RAM) or a memory card (e.g., a micro SD card, a memory stick) mounted in the electronic apparatus 100. In addition, the memory 110 may store programs, data, etc. for configuring various screens to be displayed on a display area of a display.

The memory 110 may store a set of instructions corresponding to at least one program executable by the processor 130. An instruction means one action statement that can be directly executed by the processor 130 in a programming writing language, and is a minimum unit for program execution or operation.

The memory 110 may include a first model 800 that outputs a word candidate list corresponding to a swipe interaction. The first model 800 may include a word database 800-1 and a word search module 800-2.

The word database 800-1 means a word dictionary including various kinds of words. The word search module 800-2 means a module for searching for a word corresponding to a trajectory formed by an input swipe interaction. The word database 800-1 may be provided in the first model 800, but this is only an example. The word database 800-1 may be stored as separate database in the memory 110.

The word search module 800-2 may search for a word estimated to correspond to a trajectory from among a plurality of words included in the word database 800-1 based on information regarding the trajectory and output a score of the retrieved word.

The memory 110 may include a second model 810 capable of outputting the suitability of a specific word in a sentence. The second model may include a NLU module, an error detection module for identifying whether there is a grammatical error in a sentence, etc.

The first model 800 and the second model 810 may include various artificial intelligence neural networks. Examples of the artificial intelligence neural networks include Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Deep Q-Networks, etc., the artificial intelligence neural networks in the present disclosure are not limited to the above-described examples except as otherwise specified.

The memory 110 may include a non-volatile memory capable of maintaining stored information even if the power supply is interrupted and a volatile memory requiring continuous power supply in order to maintain the stored information.

In FIG. 8, a volatile memory is illustrated as a separate component from the processor 130, but this is only an example. The volatile memory may be included in the processor 130 as one component of the processor 130.

The display 120 may display various information under the control of the processor 130. In particular, the display 120 may display a keypad screen and an input window that displays an input word through the keypad screen. The display 120 may display a list UI in which words included in a word candidate list are aligned according to a size of a score. Meanwhile, the display 120 may be implemented as a touch screen, a touch panel, or a flexible display.

The processor 130 may be electrically connected to the memory 120 to control overall functions and operations of the electronic apparatus 100. The processor 130 may include one processor or a plurality of processors. In particular, the one or the plurality of processors 130 may be a general-purpose processor such as Central Processing Unit (CPU), Application Processor (AP), Digital Signal Processor (DSP), etc., a graphics-only processor such as Graphics Processing Unit (GPU) and Vision Processing Unit (VPU), or an artificial intelligence-only processor such as Neural Processing Unit (NPU).

The processor 130 may load the first model and the second model from a non-volatile memory to a volatile memory, and perform various operations using the loaded model. Loading means an operation of calling data stored in the non-volatile memory and storing the data in the volatile memory so that the processor 130 can access the data.

The processor 130 may control the display 120 to display a keypad screen and a word input through the keypad screen on the input window.

The processor 130 may obtain the first word candidate list corresponding to the first swipe interaction by inputting the first information regarding a trajectory corresponding to the first swipe interaction connecting a plurality of keys on the keypad screen to the first model.

Specifically, when the first swipe interaction is input on the keypad screen 10 displayed on the display 120, the processor 130 may detect a trajectory formed by the first swipe interaction and generate the first information regarding the trajectory. Subsequently, the processor 130 may obtain the first word candidate list including at least one word corresponding to the trajectory and the score of the at least one word by inputting the first information to the first model.

The processor 130 may control the display 120 to display the first word having the highest score in the first word candidate list on the input window.

Based on the second swipe interaction contacting the first key and connecting a plurality of keys on the keypad being input while the first word is displayed, the processor 130 may remove the first word displayed on the input window, detect a trajectory corresponding to the second swipe interaction and generate the second information regarding the trajectory.

The processor 130 may obtain the second word candidate list corresponding to the second swipe interaction by inputting the generated second information to the first model. The processor 130 may control the display 120 to display the second word having the highest score in the second word candidate list on the input window.

The processor 130 may identify whether the second word candidate list includes at least one word included in the first word candidate list. The processor 130 may reduce the score of the at least one word based on a result of the identification.

Specifically, if it is identified that the second word candidate list includes at least one word included in the first word candidate list, the processor 130 may reduce the score of the at least one word by a predetermined number or change the score to zero (0). In addition, the processor 130 may control the display 120 to display the second word having the highest score in the second word candidate list whose score has been adjusted on the input window. The processor 130 may control the display 120 to display a list UI in which words in the second word candidate list of which score has been adjusted are aligned according to a size of a score.

The processor 130 may identify whether the second word candidate list includes the first word having the highest score in the first word candidate list. If it is identified that the first word is included in the second word candidate list, the processor 130 may obtain the suitability of the first word in a sentence by inputting the sentence including the first word to the second model. The processor 130 may adjust the score of the first word based on the suitability of the first word.

For example, if the suitability of the first word exceeds the first threshold value, the processor 130 may increase the score of the first word by a predetermined value. If the suitability of the first word exceeds the second threshold value and is less than the first threshold value, the processor 130 may maintain the score of the first word. If the suitability of the first word is less than the second threshold value, the processor 130 may reduce the score of the first word. Here, the first threshold value may be a value greater than the second threshold value.

If the third swipe interaction contacting the second key on the keypad and connecting a plurality of keys while the second word is displayed on the input window is input, the processor 130 may remove the third word displayed on the input window before the first word is input and obtain the third word candidate list corresponding to the third swipe interaction by inputting the third information regarding a trajectory corresponding to the third swipe interaction to the first model. In addition, the processor 130 may control the display 120 to display the fourth word having the highest score in the third word candidate list in an area in which the third word is located on the input window.

When a swipe interaction contacting a specific key and connecting a plurality of keys is input, the processor 130 may perform a function corresponding to the specific key. In other words, when a swipe interaction contacting a specific key except for the first key and the second key and connecting a plurality of keys is input, the processor 130 may perform a function matching the specific key. The specific key may be set among a plurality of keys included in the keypad screen 10 by a user in various ways.

According to an embodiment, when the fourth swipe interaction contacting the third key on the keypad and connecting a plurality of keys is input, the processor 130 may obtain the fourth word candidate list corresponding to the fourth swipe interaction by inputting the fourth information regarding a trajectory corresponding to the fourth swipe interaction to the first model.

In addition, the processor 130 may control the display 120 to convert the fifth word having the highest score among words included in the fourth word candidate list into uppercase letters and display the converted fifth word on the input window. In other words, when the fourth swipe interaction connecting a plurality of keys is input while contacting the third key, the processor 130 may control the display 120 to convert a word corresponding to the fourth swipe interaction into uppercase letters and display the converted word on the input window.

In another example, when the fifth swipe interaction contacting the fourth key on the keypad and connecting a plurality of keys is input, the processor 130 may obtain the fifth word candidate list corresponding to the fifth swipe interaction by inputting the fifth information regarding a trajectory corresponding to the fifth swipe interaction to the first model.

In addition, the processor 130 may control the display 120 to display a website address corresponding to the sixth word having the highest score in the fifth word candidate list on input window.

Specifically, the processor 130 may receive database including a website address from an external device (or a server) through the communication interface 150 and store the database in the memory 110. The processor 130 may identify whether there is an address including the sixth word among website addresses included in the address database. In addition, the processor 130 may control the display 120 to display the address including the sixth word on the input window.

For example, if the sixth word is 'cat' and there is a website address of 'www.cat.kr' in the address database, the processor 130 may control the display 120 to display the website address 'www.cat.kr' on the input window.

In another example, when the sixth swipe interaction contacting the fifth key on the keypad and connecting a plurality of keys is input, the processor 130 may obtain the sixth word candidate list corresponding to the sixth swipe interaction by inputting the sixth information regarding a trajectory corresponding to the sixth swipe interaction to the first model.

The processor 130 may identify the seventh word having the highest score in the sixth word candidate list, and control the display 120 to display a list UI including at least one word in which a suffix is added to the identified seventh word.

Specifically, the processor 130 may identify a word in which another character is added to the seventh word among a plurality of words included in the word database. If at least one word in which another character is added to the seventh word is identified, the processor 130 may control the display 120 to display a list UI consisting of the identified at least one word.

A function related to artificial intelligence which is applied to an artificial neural network, according to an embodiment is operated by the processor 130 and the memory 110. One or more processors 130 control to process input data according to a predefined operation rule or artificial intelligence model stored in the memory 110. Alternatively, when one or more processors are AI accelerators, the AI accelerators may be designed to have a structure specialized for processing a specific artificial intelligence model.

The predefined operation rule or artificial intelligence model is characterized in that it is created through learning. Here, being created through learning means that a basic artificial intelligence model is trained using a plurality of learning data by a learning algorithm so that the predefined operation rule or artificial intelligence model set to perform a desired feature (or achieve a desired purpose) is created. Such learning may be performed in the device itself in which the artificial intelligence according to an embodiment is performed, or may be performed through a separate server and/or system.

Examples of the learning algorithm include supervised learning, unsupervised learning, semi-supervised learning or reinforcement learning, but are not limited thereto.

The artificial intelligence model may consist of a plurality of neural network layers. Each of the plurality of neural network layers has a plurality of weight values, and a neural network operation is performed through an operation result of the previous layers and an operation between the plurality of weight values. The plurality of weights of the plurality of neural network layers may be optimized by the learning result of the artificial intelligence model. For example, the plurality of weights may be updated so that a loss value or a cost value obtained from the artificial intelligence model during the learning process is reduced or minimized.

Linguistic understanding is a technology for recognizing and applying/processing human language/character, and includes natural language processing, machine translation, dialog system question answering, speech recognition/synthesis, etc.

Figure 9:
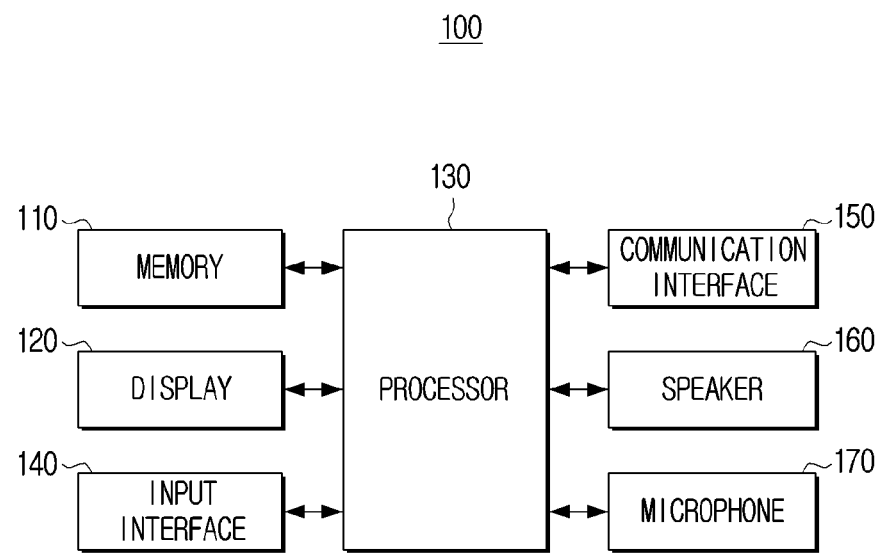
FIG. 9 is a block diagram illustrating configuration of an electronic apparatus in detail according to an embodiment.

FIG. 9 is a block diagram illustrating configuration of the electronic apparatus 100 in detail according to an embodiment. Meanwhile, as illustrated in FIG. 9, the electronic apparatus 100 may include the memory 110, the display 120, the processor 130, an input interface 140, a communication interface 150, a speaker 160, and a microphone 170.

The memory 110, the display 120 and the processor 130 illustrated in FIG. 9 have already been described above with reference to FIG. 8 and thus, overlapping description will be omitted.

The input interface 140 may receive a user input for controlling the electronic apparatus 100 and may be implemented as a hardware device including a circuit. In particular, the input interface 140 may include a touch panel for receiving a user touch using the user's finger or various pointing devices (e.g., a stylus pen). For example, the input interface 140 implemented as a touch panel may receive a swipe interaction contacting the first key or the second key on the keypad and connecting a plurality of keys.

The input interface 140 may include a button, etc. for receiving a user manipulation, and may be implemented as other input devices (e.g., a keyboard, a mouse, a motion input unit, etc.).

The communication interface 150 may perform communication with an external device. In this case, the communication between the communication interface 150 and an external device may include communication via a third device (e.g., a repeater, a hub, an access point, a server, a gateway, etc.).

The communication interface 150 may include various communication modules for performing communication with an external device. For example, the communication interface 150 may include a wireless communication module and for example, may include a cellular communication module using at least one of LTE, LTE Advance (LTE-A), code division multiple access (CDMA), wideband CDMA (WCDMA), Wireless Broadband (WiBro), 5$^{th}$ Generation (5G), etc. In another example, the wireless communication module may include, for example, at least one of wireless fidelity (WiFi), Bluetooth, Bluetooth Low Energy (BLE), Zigbee, etc.

The communication interface 150 may transmit information regarding a trajectory corresponding to a swipe interaction to an external server including the first model. In addition, the communication interface 150 may receive a word candidate list from the external server. In another example, the communication interface 150 may receive the first model or the second model from the external server.

The speaker 160 is configured to output not only various audio data for which various processing tasks such as decoding, amplification, and noise filtering have been performed but also various notification sounds or voice messages.

In particular, the speaker 160 may output a response to a user's voice as a voice message in the form of a natural language. Meanwhile, a configuration for outputting audio may be implemented as a speaker, but this is only an example. The configuration for outputting audio may be implemented as an output terminal capable of outputting audio data.

The microphone 170 may receive a user voice. In this case, the microphone 170 may receive a trigger voice (or a wake-up voice) for displaying a keypad screen on the display 120. When the trigger voice is received through the microphone 170, the processor 130 may control the display 120 to display a keypad screen and an input window.

The microphone 170 may receive a voice corresponding to a text to be displayed on the input window. When a voice corresponding to a text to be displayed on the input window is received through the microphone 170, the processor 130 may obtain a text corresponding to the voice by inputting the voice to an Auto Speech Recognition (ASR) model, and display the obtained text on the input window.

The microphone 170 may be provided in the electronic apparatus 100, but may also be provided outside and electrically connected to the electronic apparatus 100.

This disclosure is not intended to limit the embodiments described herein but includes various modifications, equivalents, and/or alternatives. In the context of the description of the drawings, like reference numerals may be used for like components.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, when it is mentioned that any component (e.g., a first component) is "directly coupled with/to" or "directly connected to" another component (e.g., a second component), it is to be understood that the other component (e.g., a third component) is not present between any component and another component.

In the present disclosure, an expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

The electronic apparatus according to various embodiments may include at least one of, for example, a smartphone, a tablet personal computer (PC), a desktop PC, a laptop PC, a netbook computer, a server, a personal digital assistant (PDA), a medical device, or a wearable device. In some embodiments, the external device may include at least one of, for example, a television, a refrigerator, an air conditioner, an air purifier, a set-top box, or a media box (e.g., Samsung HomeSync™, Apple TV™, or Google TV™).

The diverse embodiments of the disclosure may be implemented by software including instructions that are stored in machine (e.g., a computer)-readable storage media. The machine is a device that invokes the stored instructions from the storage medium and is operable according to the called instruction, and may include a server cloud according to the disclosed embodiments. When the instructions are executed by the processor, the processor may perform functions corresponding to the instructions, either directly or using other components under the control of the processor. The instructions may include codes generated or executed by a compiler or an interpreter. The machine-readable storage medium may be provided in the form of non-transitory storage medium. Here, the term 'non-transitory storage medium' means that it does not contain a signal and is tangible, but does not distinguish between semi-permanent or temporary storage of data in the storage medium. For example, the 'non-transitory storage medium' may include a buffer in which the data is temporarily stored.

According to an embodiment, the method according to the diverse embodiments disclosed in the disclosure may be included in a computer program product and provided. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In the case of the online distribution, at least a portion of the computer program product (e.g., a downloadable app) may be at least temporarily stored in a storage medium such as a memory of a server of a manufacturer, a server of an application store, or a relay server, or may be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component according to the diverse embodiments may be performed in a sequential, parallel, iterative, or heuristic manner, or at least some operations may be executed in a different order or omitted, or other operations may be added.

What is claimed is:

1. An electronic apparatus comprising:
a display;
a memory storing a first model configured to provide a recommended word corresponding to a user input that is input to the display; and
a processor configured to:
control the display to display a keypad screen and an input window that displays a word that is input through the keypad screen;
obtain a first word candidate list corresponding to a first swipe interaction by inputting, to the first model, first information regarding a first trajectory of the first swipe interaction connecting a plurality of keys on the keypad screen, and control the display to display in the input window, a first word having a highest score in the first word candidate list;
based on a second swipe interaction contacting a delete key on the keypad screen and connecting the plurality of keys being input while the first word is displayed, remove the first word displayed in the input window and obtain a second word candidate list corresponding to the second swipe interaction by inputting, to the first model, second information regarding a second trajectory of the second swipe interaction including the delete key, wherein the second swipe interaction is a swipe action continuously connecting the plurality of keys and the delete key;
control the display to display a second word having a highest score in the second word candidate list in the input window;
identify whether the first word is included in the second word candidate list;
based on identifying that the first word is included in the second word candidate list, input a sentence including the first word to a second model to obtain suitability of the first word in the sentence, wherein the second model is trained to output a probability that adding the first word to the sentence causes a grammar error; and
adjust a score of the first word based on the suitability of the first word.

2. The electronic apparatus as claimed in claim 1, wherein the processor is further configured to:
identify whether the first word displayed in the input window during the second swipe interaction contacting the delete key, is included in the second word candidate list; and
in computing scores of a plurality of second words candidates included in the second word candidate list, reduce a score of the first word based on the first word being included in the first word candidate list.

3. The electronic apparatus as claimed in claim 1, wherein the processor is further configured to:
display an initial suggestion word comprising a plurality of characters in the input window before any user input is entered,
based on a third swipe interaction making a single contact with a non-delete key on the keypad screen and connecting the plurality of keys being input while the initial suggestion word is displayed, remove the plurality of characters of the initial suggestion word displayed in the input window before the first word is input, and obtain a third word candidate list corresponding to the third swipe interaction by inputting a third trajectory of the third swipe interaction to the first model; and
control the display to display a fourth word having a highest score in the third word candidate list in an area where the initial suggestion word is located in the input window.

4. The electronic apparatus as claimed in claim 1, wherein the processor is further configured to:
based on a new swipe interaction contacting a specific key on the keypad screen and connecting the plurality of keys being input, obtain a new word candidate list corresponding to the new swipe interaction by inputting, to the first model, information regarding a trajectory of the new swipe interaction; and control the display to change a word having a highest score in the new word candidate list to uppercase letters and display the changed word in the input window.

5. The electronic apparatus as claimed in claim 1, wherein the processor is further configured to:

based on a new swipe interaction contacting a specific key on the keypad screen and connecting the plurality of keys being input, obtain a new word candidate list corresponding to the new swipe interaction by inputting, to the first model, information regarding a trajectory of the new swipe interaction; and control the display to display a website address corresponding to a word having a highest score in the new word candidate list on the input window.

6. The electronic apparatus as claimed in claim 1, wherein the processor is further configured to:

based on a new swipe interaction contacting a specific key on the keypad screen and connecting the plurality of keys being input, obtain a new word candidate list corresponding to the new swipe interaction by inputting, to the first model, information regarding a trajectory of the new swipe interaction; and identify a word having a highest score in the new word candidate list, and control the display to display a list user interface (UI) including at least one word in which a suffix is added to the identified word.

7. The electronic apparatus as claimed in claim 1, wherein the processor is further configured to, based on a user interaction for removing the second word within a threshold time after the second word in the second word candidate list is displayed on the input window not being input, train the first model based on the second word and the second information.

8. The electronic apparatus as claimed in claim 1, wherein the processor is further configured to control the display to display a list user interface (UI) in which words included in the second word candidate list are aligned according to a score of each of the words included in the second word candidate list.

9. A controlling method of an electronic apparatus comprising a first model configured to provide a recommend word corresponding to a user input that is input to a display, the controlling method comprising:

displaying a keypad screen and an input window that displays a word that is input through the keypad screen;

obtaining a first word candidate list corresponding to a first swipe interaction by inputting, to the first model, first information regarding a first trajectory of the first swipe interaction connecting a plurality of keys on the keypad screen, and displaying in the input window, a first word having a highest score in the first word candidate list;

based on a second swipe interaction contacting a delete key on the keypad screen and connecting the plurality of keys being input while the first word is displayed, removing the first word displayed on the input window and obtaining a second word candidate list corresponding to the second swipe interaction by inputting, to the first model, second information regarding a second trajectory of the second swipe interaction including the delete key, wherein the second swipe interaction is a swipe action continuously connecting the plurality of keys and the delete key;

displaying, in the input window, a second word having a highest score in the second word candidate list;

identifying whether the first word is included in the second word candidate list;

based on identifying that the first word is included in the second word candidate list, inputting a sentence including the first word to a second model to obtain suitability of the first word in the sentence, wherein the second model is trained to output a probability that adding the first word to the sentence causes a grammar error; and adjusting a score of the first word based on the suitability of the first word.

10. The controlling method as claimed in claim 9, wherein the displaying comprises:

identifying whether the first word having the highest score in the first word candidate list and displayed in the input window, is included in the second word candidate list; and in computing scores of a plurality of second words candidates included in the second word candidate list, reducing a score of the first word based on the second swipe interaction contacting the delete key to delete the first word displayed in the input window.

11. The controlling method as claimed in claim 9, further comprising:

displaying an initial suggestion word comprising a plurality of characters in the input window before any user input is entered;

based on a third swipe interaction making a single contact with a non-delete key on the keypad screen and connecting the plurality of keys being input while the initial suggestion word is displayed, removing the plurality of characters of the initial suggestion word displayed in the input window before the first word is input, and obtaining a third word candidate list corresponding to the third swipe interaction by inputting a third trajectory of the third swipe interaction to the first model; and displaying a fourth word having a highest score in the third word candidate list in an area where the initial suggestion word is located in the input window.

12. The controlling method as claimed in claim 9, further comprising:

based on a new swipe interaction contacting a specific key on the keypad screen and connecting the plurality of keys being input, obtaining a new word candidate list corresponding to the new swipe interaction by inputting, to the first model, information regarding a trajectory of the new swipe interaction; and changing a word having a highest score in the new word candidate list to uppercase letters and displaying the changed word in the input window.

13. The controlling method as claimed in claim 9, further comprising:

based on a new swipe interaction contacting a specific key on the keypad screen and connecting the plurality of keys being input, obtaining a new word candidate list corresponding to the new swipe interaction by inputting, to the first model, information regarding a trajectory of the new swipe interaction; and displaying, in the input window, a website address corresponding to a word having a highest score in the new word candidate list.

* * * * *